Jan. 5, 1971  J. J. CRESKOFF  3,553,084
VACUUM DISTILLATION PROCESS AND APPARATUS WITH DIRECT
AIR CONTACT CONDENSING FOR DESALINATION OF WATER
Filed March 15, 1968
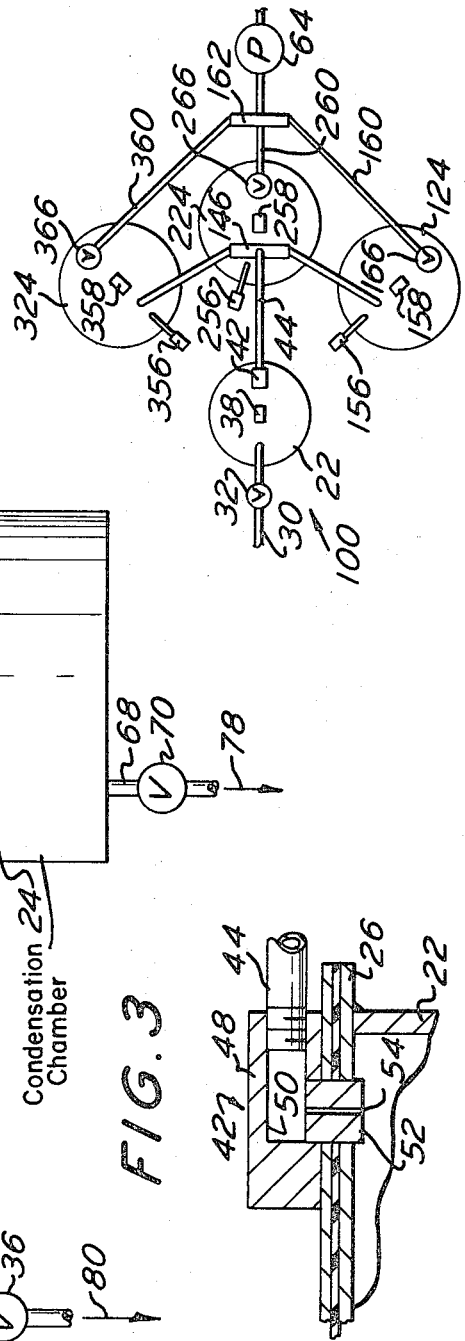
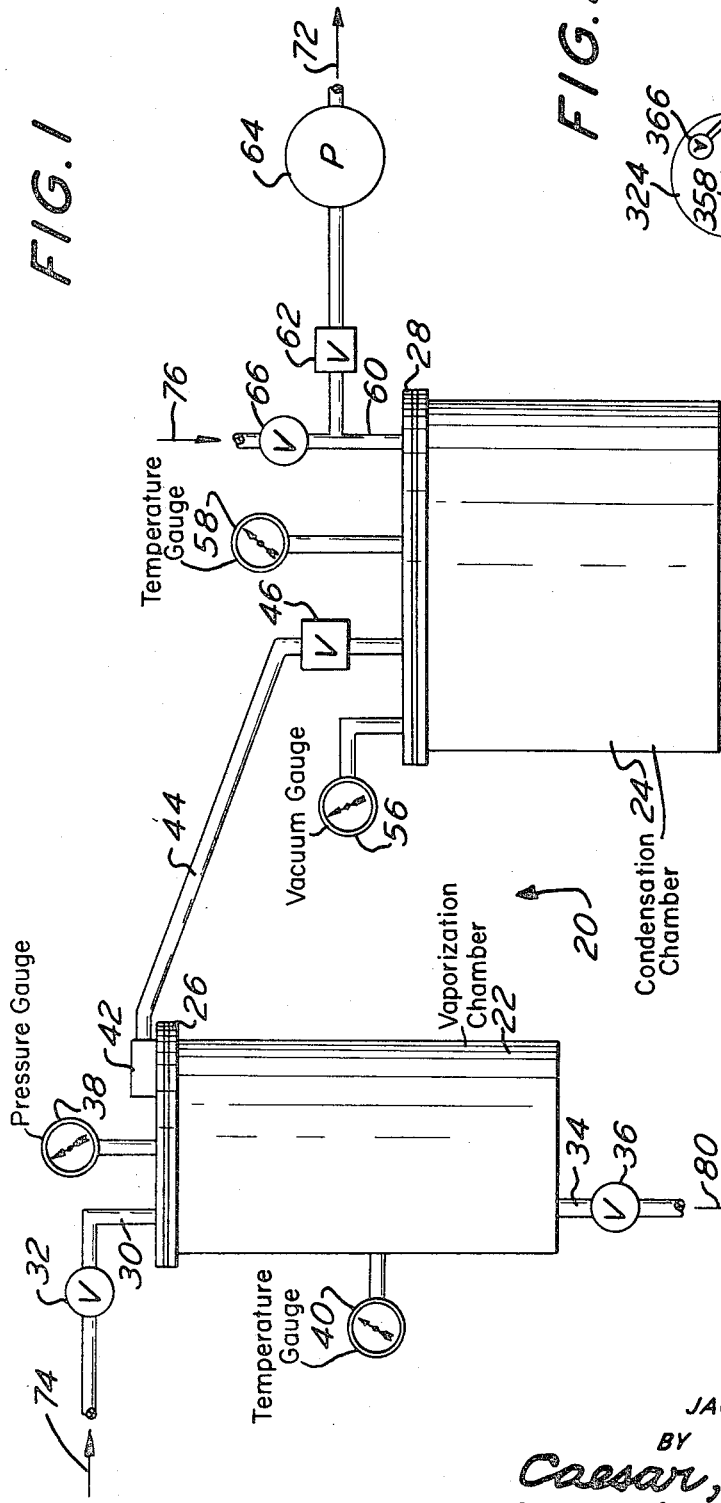
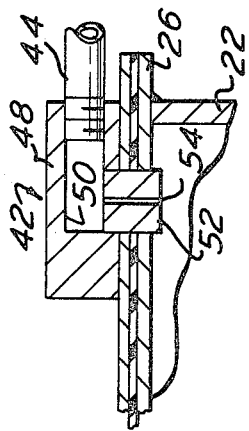
INVENTOR
JACOB J. CRESKOFF
BY
Caesar, Rivise,
Bernstein & Cohen
ATTORNEYS.

United States Patent Office 3,553,084
Patented Jan. 5, 1971

3,553,084
VACUUM DISTILLATION PROCESS AND APPARATUS WITH DIRECT AIR CONTACT CONDENSING FOR DESALINATION OF WATER
Jacob J. Creskoff, Wynnewood, Pa., assignor to Vacuum Concrete Corporation of America, Philadelphia, Pa., a corporation of Pennsylvania
Filed Mar. 15, 1968, Ser. No. 713,348
Int. Cl. B10d 3/10
U.S. Cl. 203—2                                    6 Claims

ABSTRACT OF THE DISCLOSURE

A method or apparatus of desalinating water which comprises heating saline water; providing the heated saline water in a first chamber; connecting the first chamber to a second chamber which is at a reduced pressure; the reduced pressure from said second chamber causing increased boiling of said heated saline water in said first chamber so that the saline water vaporizes rapidly. The vapor is drawn into said chamber by the partial vacuum; the first chamber and the second chamber are disconnected when the second chamber reaches a predetermined temperature and atmospheric pressure is then applied to the second chamber to condense the vapor-steam content of the second chamber. The vapor is immediately condensed thereby producing an aerated desalinated water in the second chamber.

---

This invention relates generally to desalination of water and more particularly to a method and apparatus for desalination of saline water to provide potable water inexpensively.

Though the earth is abundantly supplied with water, only a small portion of the total supply of water on the earth is potable. That is, the majority of water is ocean and sea water which is not potable. A recommended standard for potable water is that the water shall contain no more than 500 parts per million (p.p.m.) by weight of salt. Brackish water contains approximately 2,500 p.p.m.; ocean water contains approximately 27,300 p.p.m.; and dead sea water contains approximately 173,000 p.p.m.

Many systems of desalination are known. However, due to the disadvantages of the known systems, they are as yet impractical. The chemical methods, in other words, those methods which utilize chemicals to separate the salt from the water, are prohibitively expensive. The methods which utilize distillation of the saline water have the advantage of producing water which has low part per million content by way of salt. However, the heretofore known distillation systems have the following disadvantages. In order to distill the water, the water must first be boiled, the vapor collected and condensed and then the desalinated water is collected. Thus, in addition to having the cost of heating the water to boiling, the condensation coils and the refrigeration equipment add very greatly to the cost of known distillation systems. Moreover, since the water is boiled in order to separate the water from the salt content, the water which is produced by the condensation coils is flat in that the air has been cooked out of the water. The water produced by the known distillation method is therefore peculiar tasting. Also, the distillation is a slow process in that the water cannot be boiled too fast without causing slugs of salt water to get into the condensation coils and thereby contaminate the water produced by the system.

It is therefore an object of the invention to overcome the aforementioned disadvantages.

Another object of the invention is to provide a new and improved method of desalinating water which comprises heating the saline water, exposing the heated water to a partial vacuum and then applying atmospheric pressuer to condense the vapor and form aerated desalinated water.

Another object of the invention is to provide a new and improved method of desalinating water which removes substantially all of the salt from saline water yet which produces potable water having a conventional taste.

Another object of the invention is to provide a new and improved method of desalinating water which enables high rates of distillation of the saline water.

Yet another object of the invention is to provide a new and improved apparatus for the desalination of water which includes a vaporization chamber having a suppressor port for preventing slugs of the saline water from entering the remainder of the system and thereby contaminating the desalinated water.

Yet another object of the invention is to provide a new and improved apparatus for desalination of water which comprises a first chamber for vaporizing the saline water by the application of a partial vacuum and a second chamber for condensing the vapor therein by applying atmospheric pressure thereto.

Yet another object of the invention is to provide desalinated water which is simultaneously aerated and desalinated by providing atmospheric pressure to the vapor formed form the saline water to immediately condense the vapor and produce the aerated water.

These and other objects of the invention are achieved by providing a method and apparatus of desalinating water which comprises heating the saline water; providing the heated saline water in a first chamber; providing a second chamber having a partial vacuum therein; connecting the partial vacuum from the second chamber to the first chamber to cause rapid vaporization of the heated saline water, the vapor from the first chamber being drawn into the second chamber by the partial vacuum therein; disconnecting the first chamber from the second chamber when the second chamber reaches a predetermined temperature and applying atmospheric pressure to the second chamber so that the entire vapor content thereof is condensed an produces aerated desalinated water.

Other objects and many of the attendant advantages of this invention will be readily appreciated as the same becomes better understood by reference to the following detailed description when considered in connection with the accompanying drawings wherein:

FIG. 1 is a diagrammatic side elevational view of the apparatus embodying the invention which illustrates the principle of operation of the method and apparatus embodying the invention;

FIG. 2 is a diagrammatic top plan view of a preferred embodiment of the apparatus for desalination of water; and FIG. 3 is a vertical sectional view taken through the suppressor orifice which prevents contamination of the condensed water.

Referring now in greater detail to the various figures of the drawings wherein similar reference characters refer to similar parts, a system for desalinating saline water which illustrates the invention is shown generally at 20 in FIG. 1.

The desalination system 20 basically comprises a vaporization chamber 22 and a condensation chamber 24. Chambers 22 and 24 are preferably comprised of stainless steel tanks.

The vaporization chamber 22 includes a cover plate 26 which is gasketed and is sealed to the vaporization chamber 22 by atmospheric pressure when under vacuum.

The condensation chamber 24 includes a cover plate 28 which is also gasketed and which is sealed to the condensation chamber 24 by atmospheric pressure when under vacuum. The vaporization chamber 22 is connected via a fluid passage means 30 to a source of heated saline water. The fluid passage means 30 basically comprises a pipe having a fluid valve 32 which is selectively actuable to open and close the fluid passage 30. Vaporization chamber 22 further includes a drain pipe 34 which includes a selectively actuable valve 36 to open and close the pipe for draining off residue that accumulates at the bottom of the vaporization chamber 22. A pressure gauge 38 is provided on the cover plate 26 of the vaporization chamber to indicate in pounds per square inches the pressure in the vaporization chamber. A temperature gauge 40 is also connected to the vaporization chamber to indicate in degrees Fahrenheit the temperature of the chamber 22.

Chamber 22 is connected to condensation chamber 24 by a fluid passage means comprising a suppressor port 42, a pipe 44 and a selectively actuable valve 46 to open and close the fluid passage means.

As best seen in FIG. 3, the suppressor port 42 basically comprises a cylindrical housing 48 which is secured to the cover plate 26 and which includes an L-shaped cylindrical bore 50. Pipe 44 is threadedly secured in a first leg of bore 50 and a cylindrical insert 52 is secured in the downwardly extending leg of bore 50.

Insert 52 is substantially solid and includes a longitudinally extending opening 54 which acts as the fluid passage of port 42 which is provided centrally of the insert 52 and is of a substantially reduced diameter from the opening in bore 50. As will hereinafter been seen in greater detail, the suppressor port 42 prevents the exiting of salt water slugs through the opening 54 and into pipe 44 which lead to the condensed desalinated water. Thus, the contamination of the desalinated water is prevented even though the heated water in vaporization chamber 22 is boiling very rapidly.

A vacuum gauge 56 and a temperature gauge 58 are provided on the cover plate 28 which indicate in pounds per square inches and degrees Fahrenheit, respectively, the pressure and temperature of the chamber 24. The condensation chamber 24 is connected via a fluid passage means or pipe 60 and valve 62 to a vacuum pump 64. The chamber 24 is also connected via pipe 60 and valve 66 to atmospheric pressure. Valves 62 and 66 are each selectively actuable to open and close the flow of fluid therethrough. A pipe 68 is also provided at the bottom of the condensation chamber 24 which includes a valve 70 which is selectively actuable to open and close the flow through pipe 68. The pipe 68 is provided to remove the collected water from the condensation chamber 24.

Valves 32, 36, 46, 62, 66 and 70 are preferably automatically actuable. However, the valves can also be manually controlled. Where automatic valves are preferred, the valve may be either pneumatically controlled, solenoid controlled or be opened and closed by time gear operation.

To desalinate saline water in accordance with the invention, the apparatus is utilized in accordance with the operations listed hereinabove.

In order to desalinate water, valve 46 is closed, valve 66 is closed, valve 70 is closed and valve 62 is open in condensation chamber 24.

After heated saline water is provided in vaporization chamber 22, valves 32 and 36 are also closed.

The vacuum pump 64 then produces a partial vacuum through pipe 60 in the condensation chamber 24. The fluid exhausted from chamber 24 is exhausted from the pump in the direction of arrow 72. The pressure in the condensation chamber 24 is reduced to a vacuum in the order of twenty-five inches (25″) of mercury. After this pressure is achieved, valve 62 is closed, valve 46 is then opened thereby causing reduced pressure to be applied via valve 46, pipe 44 and suppressor port 42 to the vaporization chamber 22.

If there is not enough heated water in the vaporization chamber 22, valve 32 is opened thereby enabling added heated saline water to enter pipe 30 in the direction of arrow 74 and enter into the vaporization chamber 22.

The reduced pressure in the vaporization chamber causes the heated brine to boil rapidly. The boiling of the heated brine causes vapor to be formed which is drawn through the suppressor orifice into the pipe 44, past valve 46 into the condensation chamber 24. The suppressor port 42 acts to suppress slugs of saline water from passing into the pipe 44 and into the condensation chamber 24. The suppressor port acts in this manner in that the relationship between the cross-sectional area of the vaporization chamber and that of the opening 54 is proportional to the ratio between the specific volume of vapor which can be formed from the liquid and that of the liquid at any pressure and temperature.

For example, with the liquid in the vaporization chamber at one (1) p.s.i. absolute pressure and at 102° Fahrenheit, the specific volume of the vapor is approximately 20,000 times that of the liquid. Hence, the cross-sectional area of the vaporization chamber should be 20,000 times that of the opening 54 where the vaporization chamber is at a temperature of 102° Fahrenheit and at an absolute pressure of one (1) p.s.i. In another example, with the liquid in the vaporization chamber at twenty-one (21) p.s.i. absolute pressure and 231° Fahrenheit, the specific volume of the vapor is approximately 1,000 times that of the liquid. Thus, the cross-sectional area of the vaporization chamber should be 1,000 times that of the opening 54 where the vaporization chamber is at a temperature of 231° Fahrenheit and at a pressure of twenty-one (21) p.s.i. It is contemplated that in a preferred embodiment, the vaporization chamber is to be under absolute pressures varying from one (1) p.s.i. to twenty-one (21) p.s.i., and temperatures which vary from 102° Fahrenheit to 231° Fahrenheit. The ratio between the cross-sectional area of the vaporization chamber and that of the opening 54 should therefore be at the maximum ratio or approximately 20,000. The opening 54 is thus designed to be $\frac{1}{20,000}$ of the area of the vaporization chamber.

As vapor is drawn through pipe 44 into the condensation chamber 24 by the lower pressure in the chamber 24, the temperature of the condensation chamber 24 is increased. The vaporization is predominantly unchanged in state with a portion of the vapor having been changed from the vapor state to a liquid as a result of the reduced temperature of the chamber 24. When the condensation chamber 24 reaches a predetermined temperature and pressure, the valve 46 is closed thereby disconnecting the vaporization chamber 22 from the condensation chamber 24 and the valve 66 is then opened.

Where manual valves are used, the gauges 56 and 58 are visually inspected to determine the temperature and pressure. When the predetermined pressure is reached, the valve 46 is manually closed and the valve 66 is manually opened. In an automatic operation, the gauges 56 and 58 act to control the closing of valve 46 and the opening of valve 66.

After valve 66 is opened, atmospheric pressure enters the pipe 60 in the direction of arrow 76 and causes an immediate condensation of the vapor in the condensation chamber 24. The sudden change of state from vaporized to liquid by the sudden burst of atmospheric pressure and the presence of air causes the water formed in the condensation chamber 24 to be aerated as well as desalinated.

The valve 70 is then opened and the water formed in condensation chamber 24 is released in the direction of arrow 78 and is collected for further use as drinking water, etc.

The valves 66 and 70 are then closed and after the condensation chamber 24 has sufficiently cooled, the valve 62 is opened and vacuum pump 64 causes a partial vacuum in the condensation chamber 24 again. The valve 62 is closed after the pressure in chamber 24 is sufficiently reduced again and the second desalination cycle is started. The sequence of steps in the first cycle is repeated and then a third cycle started and so on.

After a number of desalination cycles, the residue of the heated saline water builds up at the bottom of vaporization chamber 22. To remove the residue, the valve 36 is opened and the residue is flushed out by the saline water in the chamber which exits the chamber through pipe 34 in the direction of arrow 80 in FIG. 1.

It can therefore be seen that a new and improved method of desalination of water has been provided. The vaporization of the heated water in the vaporization chamber 22 is increased in that the vaporization chamber is connected to a source of reduced pressure during the vaporization of the saline water. Thus, the pressure in the chamber does not increase as the saline water vaporizes. Moreover, the increased rate is maintained without enabling slugs of salt water to contaminate the remainder of the system as a result of the suppressor port 42.

The desalinated water is produced without expensive cooling coils in that condensation is performed by atmospheric pressure and thus requires no moving parts. Moreover, the use of atmospheric pressure to change the vapor to the liquid state of water enables simultaneous aeration and condensation to provide a better tasting water.

Since the condensation chamber 24 is heated during the process as vapor is collected therein, it is preferable that a plurality of condensation chambers be provided for each vaporization chamber. At least three condensation chambers should be provided for one vaporization chamber. However, experimentation has shown that the system should preferably include approximately twelve condensation chambers for each vaporization chamber.

Referring to FIG. 2, a system 100 for desalination of water is illustrated.

System 100 includes vaporization chamber 22 which is connected via pipe 30 to the heated saline water. Valve 32 is provided in pipe 30 to open and close the entry to the vaporization chamber of heated saline water. The vaporization chamber 22 is connected via suppressor port 42 and pipe 44 to a three-way valve 146 which is either manually or automatically controlled to connect pipe 44 to one of three condensation chambers 124, 224 or 324. It should be understood that additional condensation chambers can be used by making valve 146 capable of connecting each of the condensation chambers individually to the vaporization chamber.

The valve 146 preferably comprises a manifold which is selectively controlled to connect one of the plurality of condensation chambers to the vaporization chamber 22. Condensation chambers 124, 224 and 324 are each similar to the condensation chamber 24 and each includes a pressure gauge and temperature gauge.

Condensation chamber 124 includes a pressure gauge 156 and a temperature gauge 158. Condensation chamber 224 includes a pressure gauge 256 and a temperature gauge 258. Condensation chamber 324 includes a pressure gauge 356 and a temperature gauge 358.

The condensation chamber 124 is connected via a valve 166 to atmospheric pressure. Valve 166 is similar to valve 66 and is selectively actuable to open or close the inlet pipe to the chamber. Similarly, chambers 224 and 324 are connected via valves 266 and 366, respectively, to atmospheric pressure.

Condensation chamber 124 is connected via pipe 160 to a three-way valve 162 which is in turn connected to vacuum pump 64. Valve 162 is similar to valve 146. The condensation chambers 224 and 324 are connected via pipes 260 and 360, respectively, to the three-way valve 162. Valve 162 selectively connects one of the plurality of condensation chambers 124, 224 and 324 to the vacuum pump 64 at a time. Each of the condensation chambers 124, 224 and 324 is otherwise similar to the condensation chamber 24 shown in FIG. 1. As hereinbefore noted, more than three condensation chambers may be utilized with vaporization chamber 22. Where more than three condensation chambers are utilized, the valves 146 and 162 selectively connect each of the plurality of condensation chambers to the vaporization chamber 22 and to pump 64. That is, where twelve condensation chambers are used with condensation chamber 24, valves 146 and 162 would each be twelve-way valves. Thus, the single vacuum pump and the single vaporization chamber are preferably provided with a plurality of condensation chambers.

The system 100 is operated to desalinate water in the manner hereinafter set forth.

The valve 32 is initially opened to enable vaporization chamber 22 to receive the necessary quantity of heated saline water. Valve 32 is then closed. Valve 162 is placed in the position connecting pump 64 to condensation chamber 124 which enables vacuum pump 64 to form a partial vacuum in condensation chamber 124. When it is determined by the reading of pressure gauge 156 that the pressure in the condensation chamber 124 is sufficiently reduced, the valve 162 is switched so that the vacuum pump is connected to condensation chamber 224. Pump 64 thus starts to evacuate condensation chamber 224.

Valve 146 is then switched to connect pipe 44 to the condensation chamber 124 thereby connecting the condensation chamber 124 to the vaporization chamber 22. The heated saline water in chamber 22 starts to boil rapidly as the reduced pressure is connected to the vaporization chamber. The vapor formed in the vaporization chamber is then drawn into condensation chamber 224.

The vapor in condensation chamber 124 causes the temperature to rise. When chamber 224 reaches a predetermined temperature, the valve 146 is connected to condensation chamber 224. Condensation chamber 224 had been reduced in pressure by the connection of the vacuum pump 64 via valve 162 to the condensation chamber 224. Prior to valve 146 being switched to connect condensation chamber 224 to the vaporization chamber 22, the valve 162 is switched to connect vacuum pump 64 to condensation chamber 324. Vacuum pump 64 then starts to evacuate condensation chamber 324. Valve 166 is then opened to enable atmospheric pressure to condense the vapor in condensation chamber 124. After the vapor is condensed, valve 166 is closed again.

When the condensation chamber 224 is connected to vaporization chamber 22 by valve 146, the heated water in the vaporization chamber boils rapidly again thereby causing vaporization to enter into the condensation chamber 224. When the condensation chamber 224 reaches the predetermined temperature, the valve 146 is switched to connect the condensation chamber 324 to vaporization chamber 22. As the condensation chamber 224 receives vapor from vaporization chamber 22, the predetermined partial vacuum is produced in condensation chamber 324 and the valve 162 is then switched to connect the pump to the next condensation chamber to be utilized. Since there are three condensation chambers, the vacuum pump is next connected to the condensation chamber 124 again.

Valve 266 is then opened after valve 146 is switched thereby enabling atmospheric pressure to condense the vapor in condensation chamber 224 to produce desalinated water therein. The connection of the condensation chamber 324 to vaporization chamber 22 by valve 146 causes the heated saline water in vaporization chamber 22 to boil rapidly again thereby causing the vapor to be drawn into the condensation chamber 324. When condensation chamber 324 reaches the predetermined temperature, valve 146 is switched to condensation chamber 124. Valve 366 is then opened enabling atmospheric pressure to condense the vapor in condensation chamber 324.

It can therefore be seen that each of the condensation chambers 124, 224 and 324 are connected sequentially to the vaporization chamber 22. Each of the condensation chambers is heated to the same predetermined temperature and the value is then switched to the next condensation chamber. The atmospheric pressure is admitted to each of the condensation chambers after they have reached the predetermined temperature and thereby produces aerated desalinated water in each of the chambers. The condensation chambers are then exhausted to collect desalinated water.

The use of a plurality of condensation chambers acts to make the desalination process embodying the invention more efficient in that the condensation chambers 124, 224 and 234 are given time to cool off while the remaining condensation chambers are being used in connection with vaporization chamber 22. The three-way valves 146 and 162 are preferably automatically controlled. The valves are so controlled that valve 162 closes off a condensation chamber by being switched to the next condensation chamber prior to connection of the vaporization chamber to a first condensation chamber.

For example, prior to the switching of the valve 146 from condensation chamber 124 to condensation chamber 224, valve 162 is switched from condensation chamber 224 to condensation chamber 324 and so on throughout the cycle.

It can therefore be seen that the vacuum pump 64 is sequentially connected to the condensation chambers 124, 224 and 324 and then back to 124, 224 and so on. The valve 146 connects each of the condensation chambers 124, 224 and 324 to the vaporization chamber 22 after each of the condensation chambers has been sufficiently reduced in pressure by the vacuum pump 64.

To further facilitate cooling of the condensation chambers 124, 224 and 324, it is contemplated that the condensation chambers 124, 224 and 324 be placed in the saline water which is to be desalinated. The chambers 124, 224 and 324 are preferably positioned in the saline water prior to the saline water being heated. In this manner, the heat taken from the condensation chambers 124, 224 and 324 is utilized to begin heating the saline water.

It should be understood that this invention is not limited to removing salt from saline water but is contemplated to remove salt as well as other foregin dissolved particles and/or particles in suspension from saline and other types of polluted water.

Without further elaboration, the foregoing will so fully illustrate my invention that others may, by applying current or future knowledge, readily adapt the same for use under various conditions of service.

What is claimed as the invention is:

1. A method of removing impurities and foreign material from polluted water comprising the following steps:
    (a) providing heated polluted water in a vaporization zone which is normally isolated from the surrounding atmosphere;
    (b) creating a partial vacuum in a condensation zone which is normally isolated from the surrounding atmosphere;
    (c) providing fluid communication between the top of said vaporization zone and the top of said condensation zone;
    (d) vaporizing the heated polluted water in said vaporization zone as a result of the partial vacuum created by steps (b) and (c), said resulting vapor being drawn into said condensation zone;
    (e) determining the temperature in said condensation zone;
    (f) discontinuing the communication between said zones when said condensation zone reaches a predetermined temperature; and
    (g) exposing the vapor in the condensation zone directly to air at atmospheric pressure so that the entire vapor content is immediately condensed and aerated.

2. The invention of claim 1 wherein said fluid communication is constricted at the top of said vaporization zone to suppress slugs of boiling saline water in said vaporization zone from entering said condensation zone.

3. The invention of claim 1 and further including the steps of creating a partial vacuum in a plurality of condensation zones and providing sequential fluid communication between the top of said vaporization zone and each of said condensation zones, said fluid communication being shifted from one condensation zone to the next after the fluid communication from the previous condensation zone has been discontinued.

4. The invention of claim 1 wherein said polluted water comprises saline water.

5. In an apparatus for removing impurities and foreign material from polluted water, a vaporization chamber for converting heated water into vapor and a condensation chamber having a partial vacuum therein for collecting said vapor and converting said vapor into potable water, said condensation chamber being connected to said vaporization chamber by fluid passage means, said fluid passage means including a suppressor port, said suppressor port being provided at the outlet of said vaporization chamber to prevent slugs of boiling polluted water from entering into said condensation chamber, said suppressor port having a reduced diameter of opening so that the ratio of the area of the vaporization chamber to said opening in said suppressor port is in the range of 1,000 to 20,000 in accordance with the maximum ratio of the specific volume of the vapor to that of the liquid in the temperature and pressure range within which the vaporization chamber operates.

6. The invention of claim 5 wherein said condensation chamber is connected via a fluid passage valve to atmospheric pressure, said valve being opened when said condensation chamber reaches a predetermined temperature to immediately condense and aerate the vapor in the condensation chamber.

References Cited

UNITED STATES PATENTS

| | | | |
|---|---|---|---|
| 51,403 | 12/1865 | Haeck | 202—197 |
| 2,617,759 | 11/1952 | Joyner | 202—186 |
| 2,680,708 | 6/1954 | Cook | 202—197 |
| 2,975,107 | 3/1961 | Friedman | 203—11 |
| 3,206,380 | 9/1965 | Daviau | 203—11 |
| 3,251,752 | 5/1966 | Pugh | 202—201 |
| 3,408,262 | 10/1968 | Matye | 203—11 |

WILBUR L. BASCOMB, Jr., Primary Examiner

U.S. Cl. X.R.

203—11, 40, 91, 99; 202—160, 186, 197, 201, 203, 205